US006574227B1

(12) United States Patent
Rosenberg et al.

(10) Patent No.: US 6,574,227 B1
(45) Date of Patent: Jun. 3, 2003

(54) CONNECTIONLESS COMMUNICATION NETWORK

(75) Inventors: Catherine Rosenberg, West Lafayette, IN (US); Roy Harold Mauger, Herts (GB); Daniel Vincent McCaughan, Country Down (IE)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/403,175

(22) PCT Filed: Apr. 17, 1998

(86) PCT No.: PCT/GB98/01136

§ 371 (c)(1),
(2), (4) Date: Jan. 12, 2000

(87) PCT Pub. No.: WO98/48592

PCT Pub. Date: Oct. 29, 1998

(51) Int. Cl.[7] .............................................. H04L 12/56
(52) U.S. Cl. .................... 370/395.65; 370/316
(58) Field of Search .............................. 370/321, 395.1, 370/395.43, 395.21, 254, 255, 439, 316, 476, 474; 455/428, 422, 427, 431

(56) References Cited

U.S. PATENT DOCUMENTS

| | | | | |
|---|---|---|---|---|
| 5,732,086 A | * | 3/1998 | Liang et al. | 370/410 |
| 5,826,169 A | * | 10/1998 | Natarajan | 455/13.1 |
| 6,137,798 A | * | 10/2000 | Nishihara et al. | 370/392 |
| 6,178,169 B1 | * | 1/2001 | Hodgkinson | 370/395 |
| 6,310,893 B1 | * | 10/2001 | Yuan et al. | 370/474 |

FOREIGN PATENT DOCUMENTS

EP 0 748 142 12/1996

OTHER PUBLICATIONS

Mauger, QoS Guarantees for Multimedia Services on a TDMA–Based Satellite Network, IEEE Communications, vol. 35, No. 7, Jul. 1997, pp. 56–58, 63–65.

Werner, "ATM–Based Routing in LEO/MEO Satellite Networks with Intersatellite Links", IEEE Journal On Selected Areas in Communications, vol. 15, No. 1, Jan. 1997, pp. 69–82.

Mankarious, "A Full Mesh Asynchronous Transfer Mode (ATM) Satellite Communications Network", Proceedings of MILCOM, vol. 1, Nov. 6, 1995, pp. 11–15.

Tasaka, "Link–Level Connection Control Schemes in a High–Speed Satellite Data Network: A Performance Comparison", IEEE Journal On Selected Areas in Communications, vol. 10, No. 2, Feb. 1, 1992, pp. 437–446.

* cited by examiner

Primary Examiner—Ken Vanderpuye
(74) Attorney, Agent, or Firm—Barnes & Thornburg

(57) ABSTRACT

A connectionless communications network includes a number of low earth orbit (LEO) satellite nodes. Motion of the satellites constantly changes the topology of the network. A virtual model of the network having fixed virtual nodes, is maintained in a connection control system. This virtual model is used to control the route that traffic will take through the real network. As topology changes happen in the network then the virtual nodes of the model become embodied by different real nodes and communicate their virtual identity to connected nodes. Routing of the traffic is performed with reference to the virtual network so that routing follows the current embodiment of the virtual network.

14 Claims, 11 Drawing Sheets

CONNECTIONLESS COMMUNICATION NETWORK

This invention relates to a connectionless communication network. A method is disclosed for transporting broadband services requiring Quality of Service (QoS) guarantees on a connectionless network and ensuring that the service maintains the Quality of Service determined at the start of a communication session throughout the duration of that session.

BACKGROUND OF THE INVENTION

Connectionless network operation has been traditionally used in data communications. Its main features are not to require a connection setup phase and to route each packet of a connection independently. No connection related state is then needed in the switch and a topological change in a node (i.e., its failure or its hand-over) only necessitates the update of the routing table contained in its neighbours networks based on the Internet protocol (IP) are typically connectionless. Wireless and satellite data networks are often designed for connectionless operation in order to avoid the need for explicit connection hand-overs due to the physical mobility of users or systems. Hence, in a satellite network, connectionless operation removes the need for connection related states to be held in the sky segment. Each packet of information is self routed so the network is able to adapt to changes due to hand-overs between satellites. Each hand-over can be interpreted as a change of topology.

A method of operating an ATM network by using a software representation comprising a virtual network model is described in specification No. EP-A-748142. A description of ATM-based routing in LEO/MEO satellite networks is given by M Werner et al. in IEEE Journal on Selected areas in Communications, Vol. 15, No. 1, January 1997, pages 69–82.

Transport of broadband services requiring Quality of Service (QoS) guarantees (i.e., multimedia services) over a connectionless network is a major issue since traditionally this kind of network has only offered best-effort services. QoS guarantees are usually provided through connection orientation, as in the case of BISDN networks based on ATM. For such networks, a virtual circuit is established during a set-up phase and then routing of individual packets is simplified (i.e., no decision needs to be made) since the route (i.e., the virtual circuit) has already been chosen. In that case, the trade-off between connection orientation and connectionless operation is: the need for a call set-up phase; much less processing per packet; the necessity to keep connection related state in the switches involved in the connection; easier handling of QoS guarantees; no need for end to end re-sequencing; and the need to perform a new connection set-up phase for any topological change involving a node in the route. This last point is crucial for a low earth orbit (LEO) based satellite network where topological changes are very frequent.

SUMMARY OF THE INVENTION

Against this background the invention provides a connectionless digital communication network having changeable topology and means for maintaining the bandwidth available when the topology changes.

An object of the invention is to provide an improved connectionless digital communications network.

A further object of the invention is to provide an improved method of traffic routing in a communications network of varying topology.

According to a first aspect of the invention there is provided a method of determining routing of traffic in a communications network incorporating a plurality of non-geostationary satellite nodes and having a changing topology, the method comprising providing a virtual model of the network, said model consisting of fixed virtual nodes, determining within the model routing for the traffic in the real network, reflecting said topology changes in the network by temporarily associating the virtual nodes of the model with corresponding real nodes so as to provide each said real node with a respective virtual node identity, communicate the virtual identity of each said real node to its neighbouring nodes, and performing traffic routing in the real network with reference to the current embodiment of the virtual network.

According to another aspect of the invention there is provided a communications network incorporating a plurality of non-geostationary satellite nodes and having a changing topology, the network including a virtual model consisting of fixed virtual nodes, there being means for determining within the virtual model routing for traffic in the real network, means for reflecting said topology changes in the network by temporarily associating the virtual nodes of the model with corresponding real nodes so as to provide each said real node with a respective virtual node identity, and means for communicate the virtual identity of each said real node to its neighbouring nodes so as to perform traffic routing in the real network QoS guarantees can be achieved without requiring a connection oriented function within the network so that the network endpoints remain insensitive to topological change within the network.

In a preferred embodiment, a fixed virtual model of the network is maintained and in a physical nodes advertises to adjacent physical nodes with which it has direct links, which virtual node it embodies.

Preferably before a message is transmitted from one user to another across the network, a path request is sent to a connection control centre, checks are made that a user virtual node for said one user and the virtual nodes adjacent that user virtual node all have sufficient available time slot capacity. If the adjacent virtual nodes all concur then the slot can be sustained by all of the satellites which are required to receive hand-over of the corresponding user cell.

The network preferably includes topology groups of virtual nodes, being fully interconnected within the topology group within the model.

Services are preferably ATM based.

In one implementation, the network nodes include satellites with onboard switching functions.

In another implementation the network is ground based.

A connection control system preferably directs connectionless packets to follow paths selected from a virtual model of the network.

In one preferred alternative, a user network interface is part of the plesiochronous digital hierarchy.

In another alternative, a user network interface is part of the synchronous digital hierarchy.

In yet another alternative, a user network interface is based on the asynchronous transmission mode.

The invention extends to a connection control system for a connectionless communication network, said control system acting to direct connectionless packets to follow paths selected from a virtual model of the network.

In a preferred embodiment of the invention, the physical network consists of moving nodes. A virtual model of the network, consisting of fixed virtual nodes, is maintained in a connection control system. This virtual model is used to control the route that packets will take through the real network. As topology changes happen in the network then the virtual nodes of the model become embodied by different real nodes and communicate their virtual identity to connected nodes. Routing of the packets is performed with reference to the virtual network so that packet routing follows the current embodiment of the virtual network. By ensuring that the topology changes re-establish the bandwidth available within the virtual model then the system guarantees that the quality of service established for the session is maintained.

BRIEF DESCRIPTION OF THE DRAWINGS

A preferred embodiment of the invention will now be described further, by way of example, with reference to the accompanying drawings, in which:

FIG. 2b illustrates the path request sequence of the connection control of FIG. 2a;

FIG. 4a illustrates the routing labels in a TDMA slot for connectionless routing in FIG. 4;

DESCRIPTION OF PREFERRED EMBODIMENT

Figure 1:
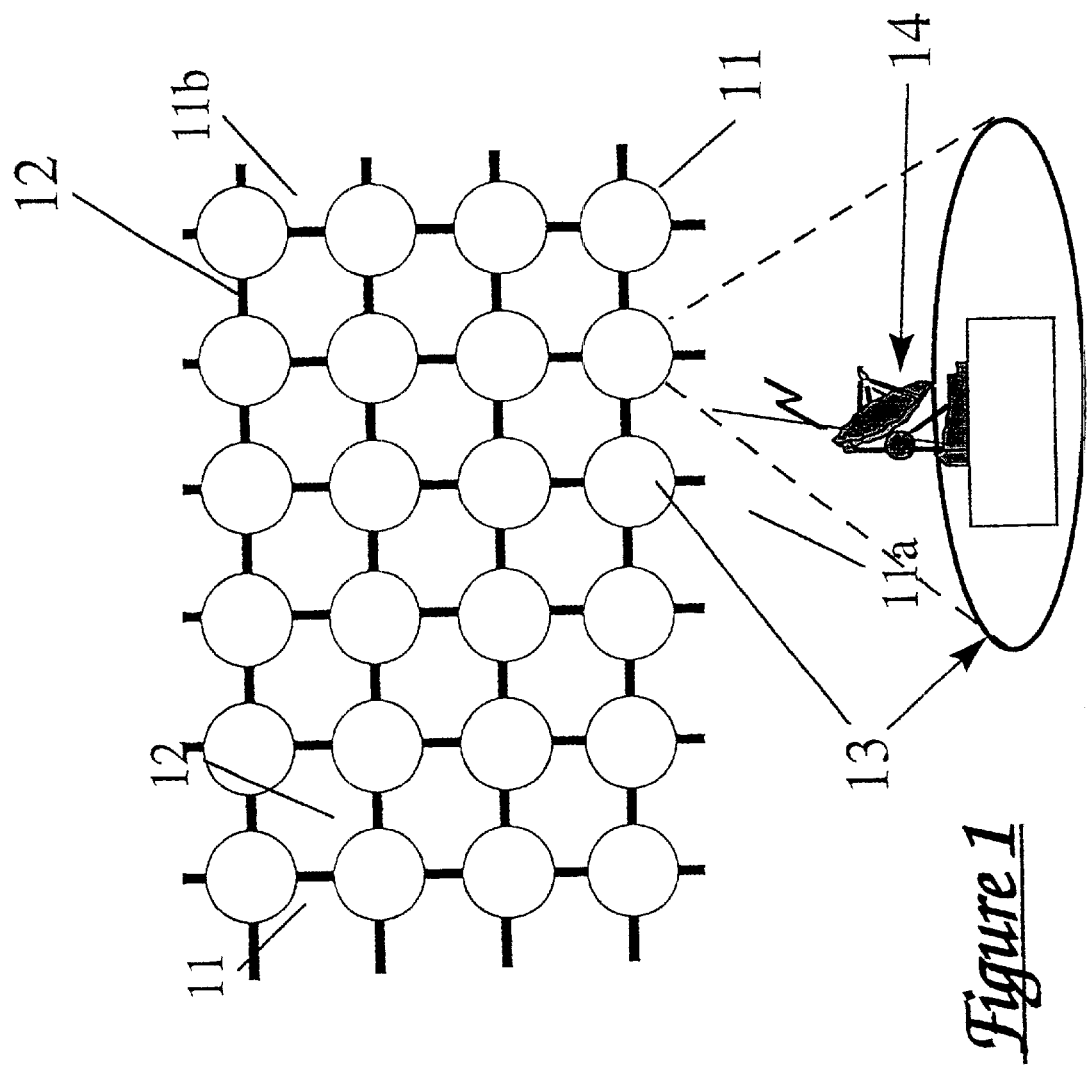
FIG. 1 is a schematic diagram of a satellite network according to a preferred embodiment of the invention.

Referring first to FIG. 1, the network comprises an array of non-geostationary satellites 11 interconnected by inter-satellite communications links 12 between adjacent satellites. These inter-satellite links will typically comprise microwave links carrying a number of communication channels. Typically, the satellites will be low earth orbit (LEO) satellites. The ground portion of the network is partitioned into a number of cells 13 each corresponding to the footprint of a satellite and each containing one or more ground stations 14. The satellites 11 communicate with the ground stations 14, typically via microwave links, and provide the nodes of a communications network in which communications traffic is routed from ground station to ground station via one or more satellites which thus form the nodes of the network. Operation of the system is controlled via, one or more network controllers 16,32.

It will be appreciated that although FIG. 1 depicts a regular array of satellites, this, in the case of non-geostationary satellite systems, is a highly idealised 'snapshot' view of the system as the satellites will be constantly in motion relative to the ground and to each other so that the network topology will be constantly changing. However, the satellite orbits and the corresponding topology changes are predictable in the short and medium term. In general, the prediction of the satellite motion and positions will be determined from a reference model which is updated from time to time from measurements of the satellite positions. Routing of traffic within this topologically changing network is determined by the use of a ground-based modelled or virtual network as will be described below.

Figure 2A:
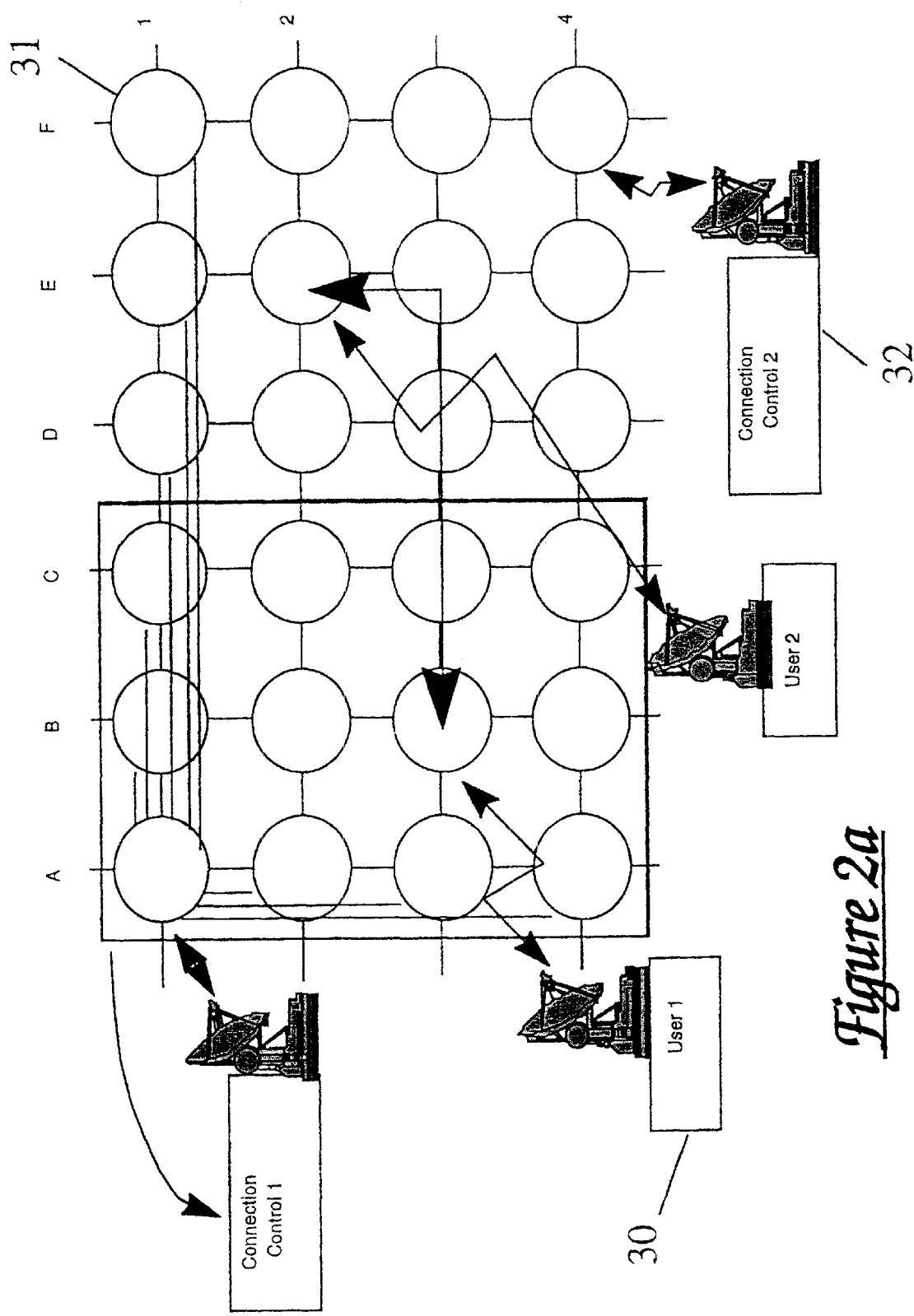
FIG. 2a illustrates the principle of the virtual model as applied to satellite networks.
Figure 3:
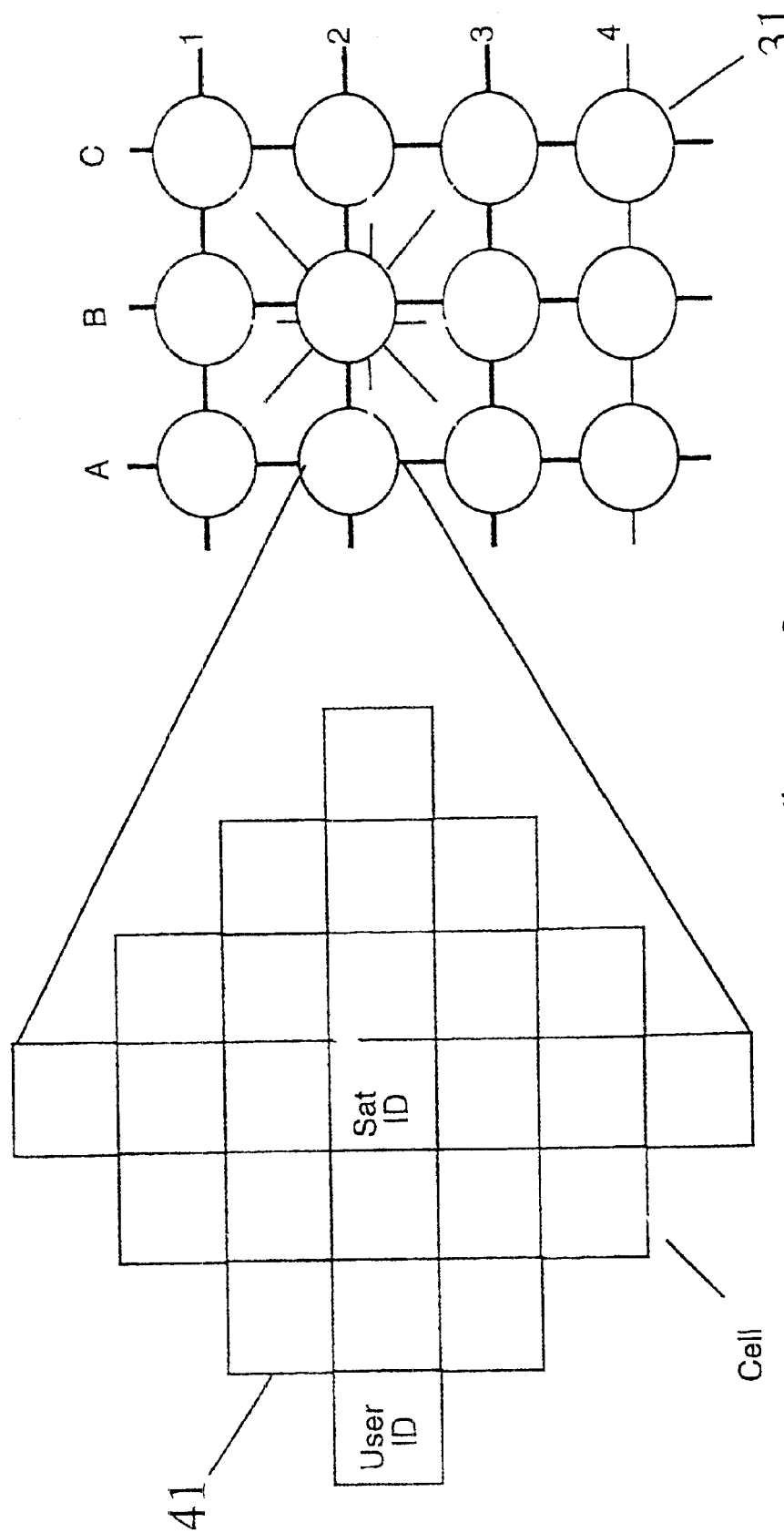
FIG. 3 illustrates the relationship between the virtual model and the real network as applied to satellite networks.

As shown in FIGS. 2a and 3, the ground-based model provides a fixed mapping between a set of cells and a modelled virtual node. Hand-over of cells means that modelled nodes may be distributed over up to nine satellites. Ownership of a particular cell 41 identifies a satellite node as embodying the ground-based, model of that virtual node. Ownership of cells is broadcast to all adjacent nodes so that the location is visible, from the satellite embodying the ground image.

In principle the routing of connectionless packets is focused along paths with known capacity between users so that the service between the users achieves an agreed quality. This is achieved by selecting paths according to a virtual model of the network whilst allowing nodes of the network to dynamically embody their virtual model node in order to continue to support the traffic stream. If the real nodes provide the same bandwidth as used in the model then the QoS is guaranteed to the end user. FIG. 2a illustrates the virtual model of the network for a satellite application of the system. The physical network consists of moving satellites, each having a footprint corresponding at a given time to many cells. Each satellite is at least connected to its immediate neighbours in the four geographical directions. All the satellites are substantially identical yielding a super symmetrical network in the sky. We create a virtual model of the network, consisting of fixed Virtual Nodes (VN), and maintained in a connection control system. Each VN is embodied at a given time by a satellite. This model is used to control the route that packets will take through the network. As topology changes happen in the network then the Virtual Nodes of the model become embodied by different satellites which communicate their new virtual identity to their connected satellites. Routing of the packets is performed with reference to the virtual model.

Connectionless packets are routed along paths with known capacity between users so that the service between the users achieves an agreed quality. This is achieved by selecting paths according to the virtual model whilst allowing satellites to dynamically embody their virtual model node in order to continue to support the traffic stream. If the real nodes provide the same bandwidth as used in the model then the QoS is guaranteed to the end user. Users are ground stations which are mapped onto Virtual Nodes of the network. Virtual nodes have direct links to a number of adjacent virtual nodes. Virtual nodes are connected to a certain number of non-adjacent virtual nodes via virtual connections. These virtual connections are ATM like in their behaviour and may be embodied by ATM or by other means. The purpose of the virtual connections is to reduce the topology of the network so that a connectionless relationship between two end points can be achieved by routing through a limited number of nodes. The architecture ensures that when the embodiment of VCOs are handed over, that the bandwidth available remains the same as that of the virtual model. Thus, the system guarantees that the Quality of Service established for the session is maintained.

Figure 2B:
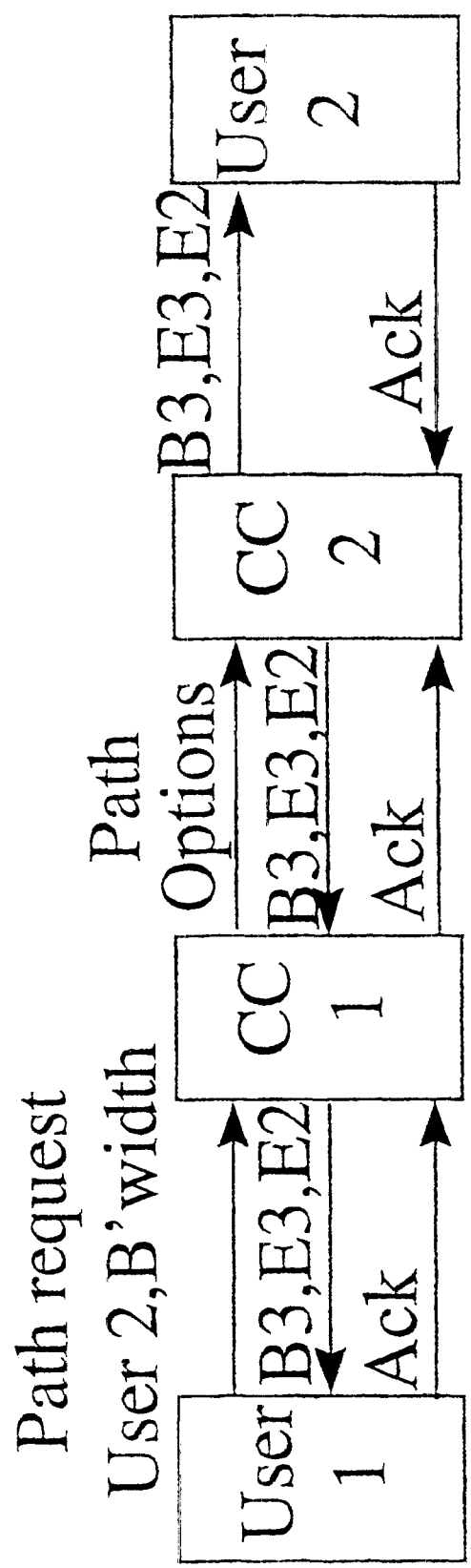

Connections between Virtual Nodes are made according to a restricted set of routing plans, the example shown in FIG. 2a being of an angular or "dogleg" connection. In order to support these routing plans, the mesh of virtual connections link all satellites according to a certain topology. For a network with a small number of satellites a full mesh would be provided. For a network with a larger number as illustrated here the mesh could include all satellites within the same constellation and in addition a further mesh of virtual connections linking all satellites which form a line of latitude around the world. Each user has a signalling link to its allocated connection control which models the part of the network within which the user resides. Connection controls are fully interconnected with semi-permanent signalling links so that the illustrated "dogleg" connection can be established on the basis of the signalling sequence illustrated in FIG. 2b. Connection control entities are provided at a small number of physical locations and control connections using an object model of all allocable resources within their section of the network.

Within satellite systems the world surface is divided up into cells. A certain number of these cells is served by a particular satellite for the duration that it is overhead and the cells are then handed over to the subsequent satellite passing over. This subsequent satellite may be a satellite in the same orbit or, due to the rotation of the earth, it may be necessary to hand over to a satellite in an adjacent orbit. Within a cell, a satellite provides a transport system, typically TDMA which allows the bandwidth to be shared between the active users located in that cell. In the virtual model, as illustrated in FIG. 3 a fixed number of cells is mapped onto a Virtual Node together with the associated users. The actual number of cells depends on the capability of the satellite. When the satellite is at the apogee of a VN then it could embody all the cells of that VN. Cells are handed over between satellites on an individual basis so that there is a discrepancy between the ground model and the real satellite embodiment, in that the cells corresponding to one Virtual Node may be embodied in up to nine satellites. In order to resolve this, a particular cells is used to identify the Virtual Node which is embodied by the satellite acquiring that cell. The identity of cells acquired by a satellite and consequently the identity of users, is advertised to adjacent satellites so that routing of packets to the node embodying the Virtual Node is sufficient to route the packet to the final destination. Bandwidth allocation within the model has to take into account that the sky based implementation will be distributed over nine satellites Satellites may occasionally fail so that the model is embodied by a system of lower capacity, this will also have to be notified to Connection Control and taken into account in bandwidth allocation. If the physical satellite network ensures that there are always, in non-degraded mode, two satellites able to receive hand-over of a cell then the ground based model will be resilient to satellite failure events.

The connection illustrated in FIG. 2a was a "dogleg" between Virtual Nodes B3, E3, E2. Three stage routing is used to deliver packets, initially to the topology group including the Virtual Node, which in this example is a constellation of satellites, then to the satellite embodying the Virtual Node and then to the current users location. A topology group is a group of fully interconnected Virtual Nodes within the network model.

Figure 4:
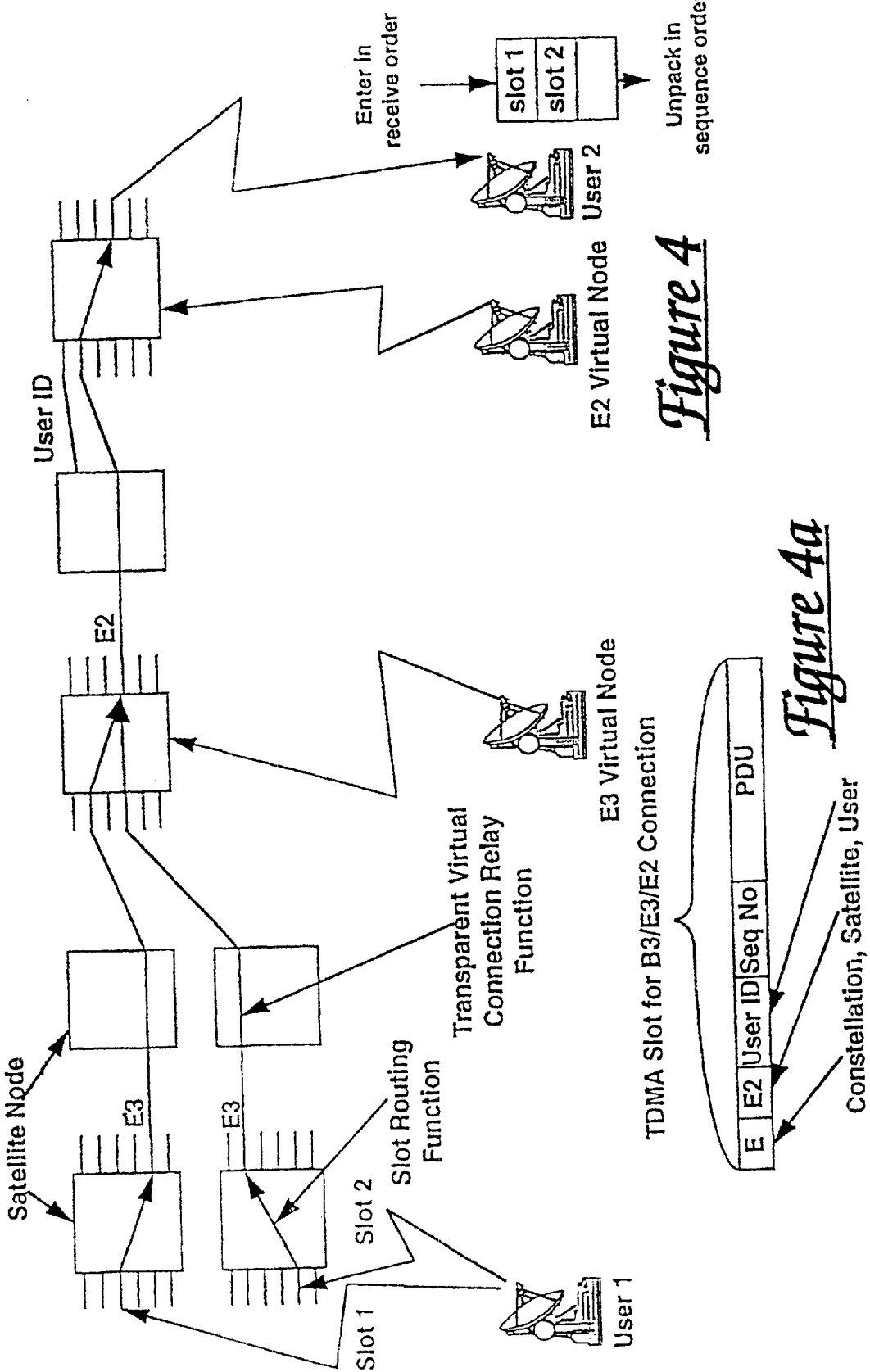
FIG. 4 illustrates the Relay/Router nodal functionality for nodes in the satellite application of the network.

The functionality of a node within this system is dual mode relay/router, this functionality being illustrated in FIG. 4. In the relay mode, the node is ATM like. Broadly, the TDMA slot is encapsulated into a connection oriented like entity (i.e., an ATM like encapsulation) for forwarding over the Virtual Connections. In this example, this entity is an AAL-2 mini-channel connection. Hence in this the relay mode, the satellite simply relays minicells on Virtual Connections without inspecting the Contents (no processing of address). In this mode, the topology reduction of the network allows the restriction of the number of routing steps for any connections. The Virtual Connections will need to be handed over in the case of satellites moving in counter-rotational orbits. So long as the hand-over maintains continuity, this has no impact on the end user.

At the routing nodes (i.e., at the satellites where routing has to be performed as opposed to relaying) the TDMA slots are inspected and the routing labels are used in a four stage process (assuming dogleg routing). Satellites which are embodying Virtual Nodes advertise their Virtual Node ID on all Virtual Connections. The first stage of the routing is carried out in the satellite embodying the originating VN, i.e., the one corresponding to user 1 (in the case depicted in FIG. 2 this VN is B3). The second stage is performed in the satellite embodying the VN which is at the intersection of the fully meshed latitude group containing the originating VN and the fully meshed constellation containing the receiving VN (depending on the 'direction' of the dogleg it may be between the constellation and the latitude group). In the case depicted in FIG. 2, this VN is E3. The third routing stage is carried in the satellite embodying the receiving VN (in the case depicted in FIG. 2, this VN is E2). For the final stage the receiving virtual node will identify the satellite currently owning the user's cell and forward the TDMA slot to the destination node. As slots are independently routed in the sky then they may arrive at the ground station out of order and thus require re-sequencing.

The relay/router function can be achieved using AAL2 where the relay function can be implemented by a Common Part Sublayer and the router function can be implemented as a Service Specific Convergence Sublayer. Connection control (CC) functions can be centralised on a continental scale, scaling of computer capacity is not a problem and, if located in low traffic areas, then signalling traffic is not a problem either. Such a high degree of centralisation requires geographic security. The model proposed is active/active with both CC's operating concurrently and each capable of handling the workload of the other. With this scale of Connection control then it is practical to provide pair-wise interworking between CCs for most connections. Where this is not practical then a CC would grant capacity on transparent virtual connection through its network section so that only two CC's are required in any connection negotiation. The granted capacity could be re-negotiated on a time frame substantially longer than a connection time.

Figure 8:
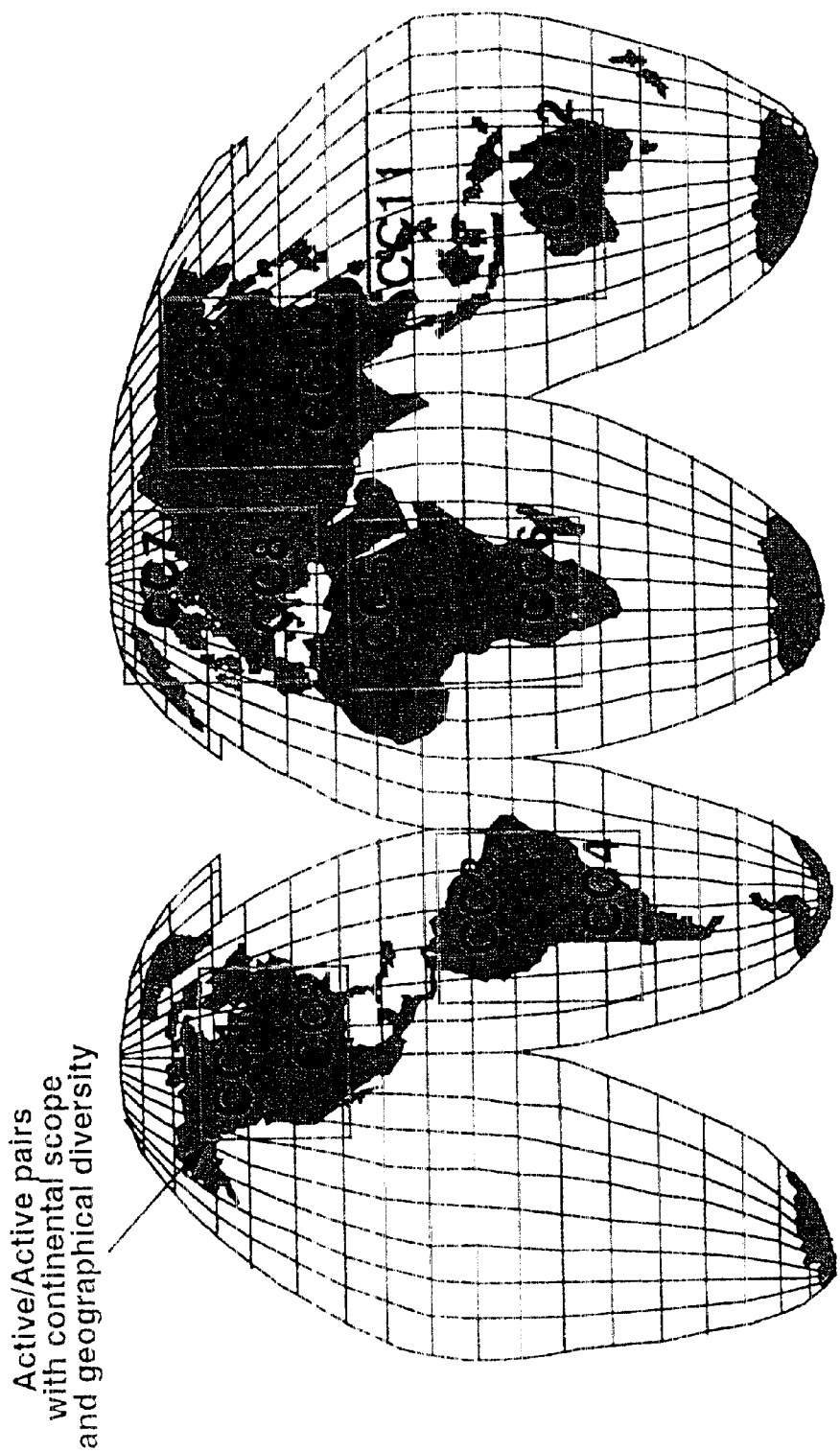
FIG. 8 illustrates, the possible scope of the connection control entities for a Satellite network.

Both Connection controls can operate in parallel on the same model check-pointing the connection details to the other CC at the end of the set-up/teardown process. A possible scoping of the connection control function is illustrated in FIG. 8.

The Virtual Connections will need to be handed over in the case of satellites moving in counter-rotational orbits. So long as the hand-over maintains continuity, this has no impact on the end user. The routing labels are invariant for the duration of the connection and are also invariant for hand-overs of any user, virtual node or virtual connection between satellites.

Within a satellite network the basic requirement to embody a path is to link TDMA slots between an uplink and a downlink. This leads to a TDMA slot as the basic unit of switching in the sky. This slot includes routing labels as the basis of connectionless routing. The routing labels are depicted in. FIG. 4a, under the assumption that the routing strategy is dogleg from a latitude to a constellation. The first label corresponds to the constellation; the second to the VN within this constellation which is the receiving VN; and the third is the user ID. At least two other routing labels are needed, one giving the sequence number of the PDU for resequencing purpose and one (not represented in FIG. 4a) to indicate the routing strategy that has been chosen.

The routing labels are invariant for the duration of the connection and are also invariant for hand-overs of any user, virtual node or virtual connection between satellites.

Figure 5:
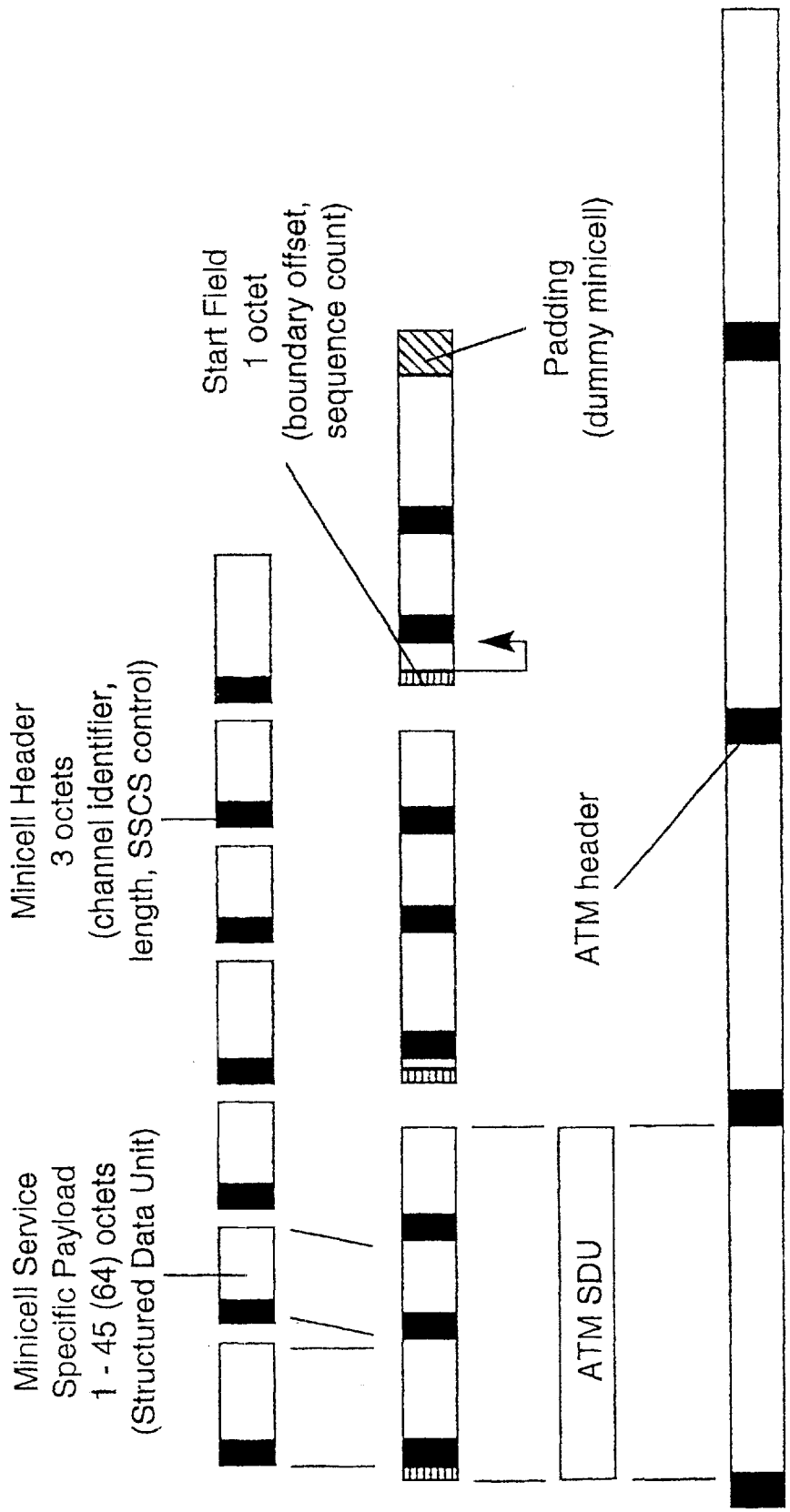
FIG. 5, illustrates the way in which the ATM Adaptation Layer is a multiplex of users of a simple ATM connection.

The AAL-2 adaptation layer has been optimised to cope with the demands of low bit-rate communications, representing the increasing trend to greater voice compression. The adaptation layer is a multiplex of users in a single ATM connection, where each user's information is carried in a short packet or minicell, with a header identifying the user channel with ancillary control information (see FIG. 5).

By sharing the fixed length payload of the ATM cell between users, the compromise of trading cell assembly delay for bandwidth efficiency is neatly side-stepped, a sacrifice which would be acute at low bit-rates and on expensive leased lines. AAL-2 adaptation equipment performs a concentration function to ensure high utilisation, but can also limit the holdover delay of traffic when usage is low.

A further feature of minicells is that they may be of variable size, from 1 to 64 octets, to accommodate a wide variety of applications with minimal overhead. Thus the mapping to ATM cells is asynchronous and in fact quite independent of the length of an ATM cell. The boundary of minicells in the ATM cell payload is signified in every cell by a start field (STF), which specifies the offset, and thus minicells form a self-delineating flow.

We have found that the AAL-2 protocol format can be employed to carry minicells transparently over access systems which have fixed frame formats other than ATM cells, such as MPEG-2 transport stream. In fact minicells do not require an ATM cell or other frame structure at all, as it is possible to map the start field octet once every 48 octets with minicells in the intervening octet positions directly onto any physical bearer. The bearer identity can be used to regenerate the implicit ATM cell headers where the VCC needs to be transported over conventional ATM transmission.

Figure 6:
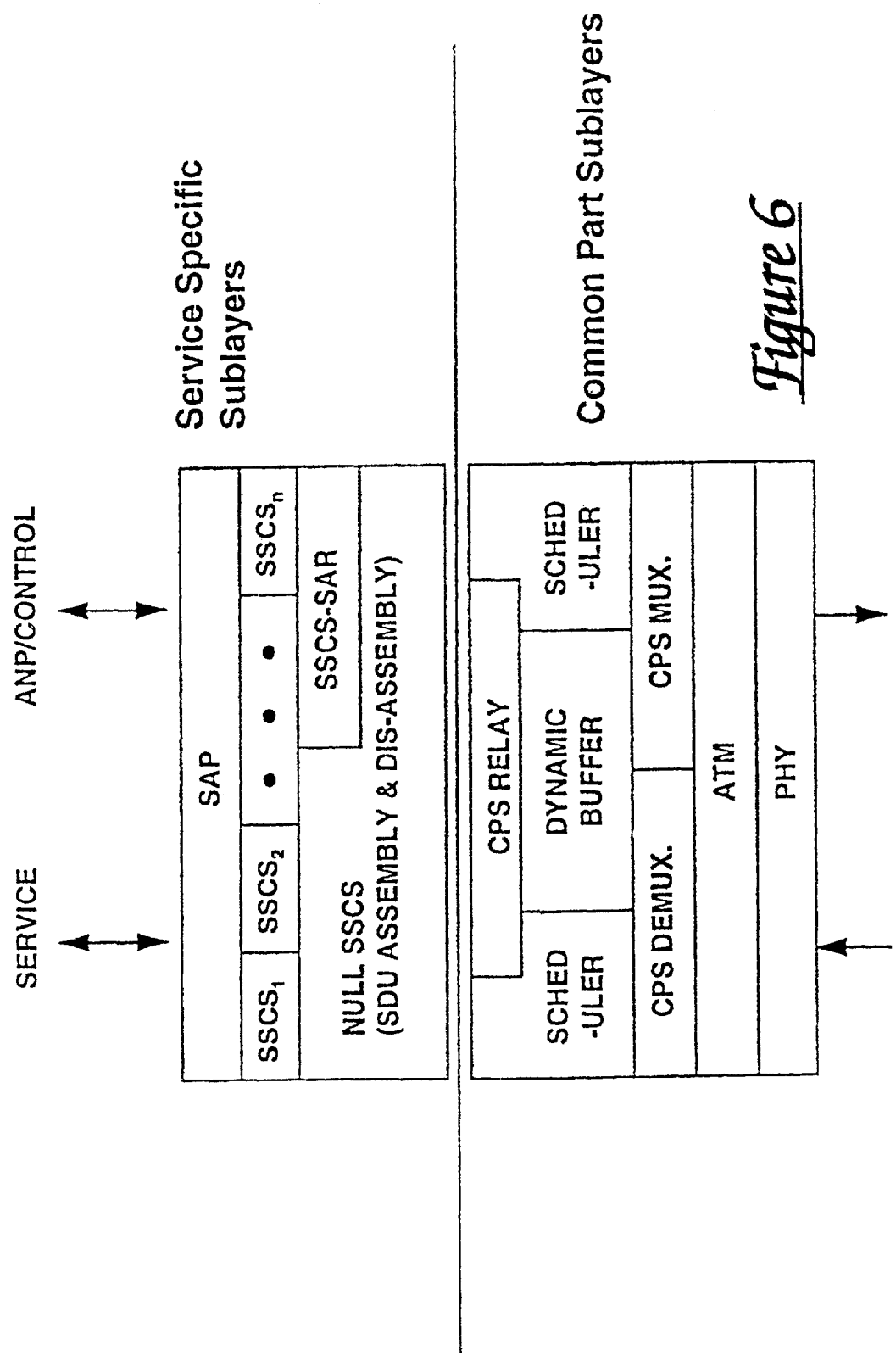
FIG. 6 illustrates the functional structure of an AAL-2 environment.

The functional structure of an AAL-2 system is illustrated in FIG. 6. ATM cells or other minicell bearer systems are carried over a physical link into the AAL-2 system. The AAL-2 system is in two parts a common part sublayer (CPS) and a Service Specific Convergence Sublayer (SSCS). The CPS has a mux and a demux function which packs and unpacks minicells from ATM cells. The unpacked minicells are placed in a dynamic buffer. Input and output schedulers drive the process of packing and unpacking minicells between the dynamic buffer and the various minicell sources and sinks. Minicells can be switched from AAL-2 VC to AAL-2 VC via a CPS relay function. This provides an AAL-2 switching layer which is analogous in many ways to a normal ATM switch. Alternatively the minicells can be passed to an SSCS level in order to adapt the format to that used at the service access point (SAP), a number of standard SSCS functions are defined including the null and segmentation and re-assembly (SAR), in addition further SSCS layers may be defined to achieve any additional functionality required by the AAL-2 application.

Figure 7:
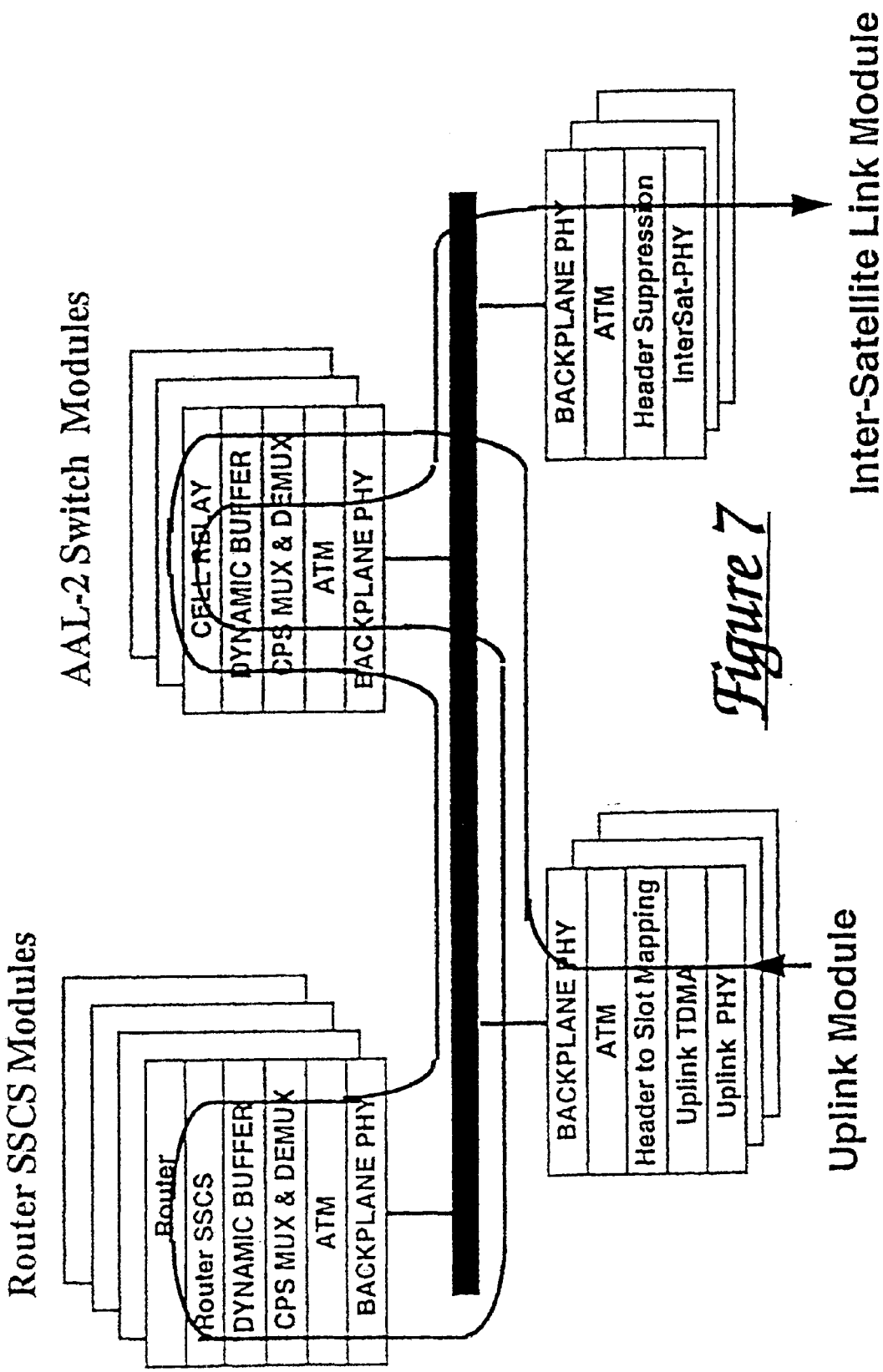
FIG. 7 illustrates the implementation of the Relay/Router node within the ATM and ML-2 environments.

The implementation of the relay/router is illustrated in FIG. 7. It comprises four modules operating through a common ATM backplane. The uplink module terminates the uplink TDMA system and maps TDMA connections as AAL-2 VC's and TDMA slots as AAL-2 minicells. These VC's are passed to an AAL-2 Switch Module where the mini-channel connections can be switched from one AAL-2 VC to another. If, for a particular virtual connection, the node is configured to operate as a router function, then the initial AAL-2 VC is associated with the uplink module and the second AAL-2 VC is associated with the router SSCS function. The router SSCS, layer provides the routing label format illustrated in FIG. 4a, and the router layer provides the functions described above associated with FIG. 4. The minicells on the inter satellite link are carried directly on the physical layer. This is achieved by a header suppression function which adds and removes headers between the external world where they are not required as there is only one AAL-2 VC persatellite link and the internal world where they are used to provide scalability of the node. In this way the actual switched entities across the satellite network are TDMA slots encapsulated as AAL-2 minicells. Connection control (CC) functions can be centralised on a continental scale. Scaling of computer capacity, is not a problem and, if located in low traffic areas, then signalling traffic is not a problem either. Such a high degree of centralisation requires geographic security, the model proposed is active with both CC's operating concurrently and each capable of handling the workload of the other. With this scale of connection control then it is practical to provide pair-wise interworking between CC's for most, connections. Where this is not practical then a CC would, grant capacity on transparent virtual connection through its network section so that only two CC's are required in any connection negotiation. The granted capacity could be re-negotiated on a time frame substantially longer than a connection time.

Both Connection controls can operate in parallel on the same model check-pointing the connection details to the other CC at the end of the set-up/tear-down process. An exemplary deployment of the connection control function (CC) is illustrated in FIG. 8. Most connections can be made with a pair-wise communication between two connection controls. Exceptionally, a third connection control can grant through capacity as a transit virtual connection.

Figure 9:
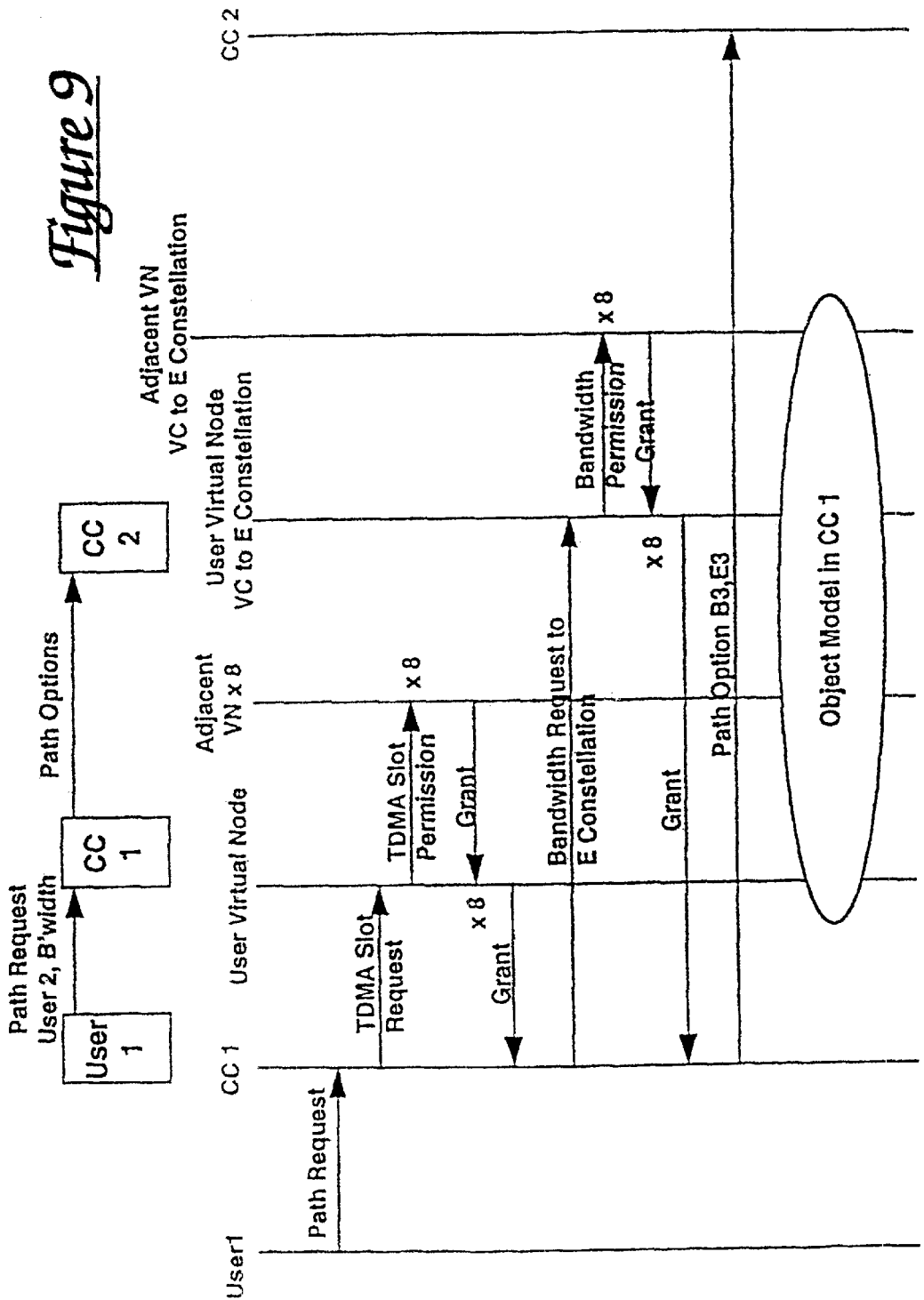
FIG. 9 illustrates communication between objects of the connection control object, model for part of the connection request sequence for a Satellite network.

The operation of the object model in connection control 1 is illustrated in FIG. 9. Object oriented technology is available which allows an array of multiprocessors interconnected by ATM to implement an object model linked by the common object request broker architecture (CORBA). CORBA technology is able to implement an object model of arbitrary complexity, the only constraint is that an individual object cannot be so active that it cannot be processed on the computer module selected for the multiprocessor system. The objects identified in the model are simple in that they allocate resource from a pool and need to compute the consequence of the resource allocation as cells are handed over in the flight path of the associated model. In the model the satellites are fixed but the resource may be consumed in any of the eight adjacent modelled satellite nodes. Such objects can be easily supported on a CORBA over ATM system. Communications between objects is by means of ATM messages between the CORBA layers of the system processors.

The fragment of the model corresponding to the first two messages of the connection control sequence shown in FIG. 2a is illustrated in. FIG. 9. The initial message is a path request from user 1 to CCI, the first check is to determine whether the user virtual node has enough TDMA slot capacity, this request is forwarded to the adjacent virtual nodes and if all concur then the slot can be sustained by all of the satellites which are required to receive hand-over of the corresponding user cell. The next check is on the capacity of the virtual connection between the user virtual node and the E constellation. Again, this traffic may be carried by any of the eight adjacent virtual nodes so permission is requested from all eight corresponding objects. If all is well, then the Path Option B3. E3 can be forwarded to CC 2.

Figure 10:
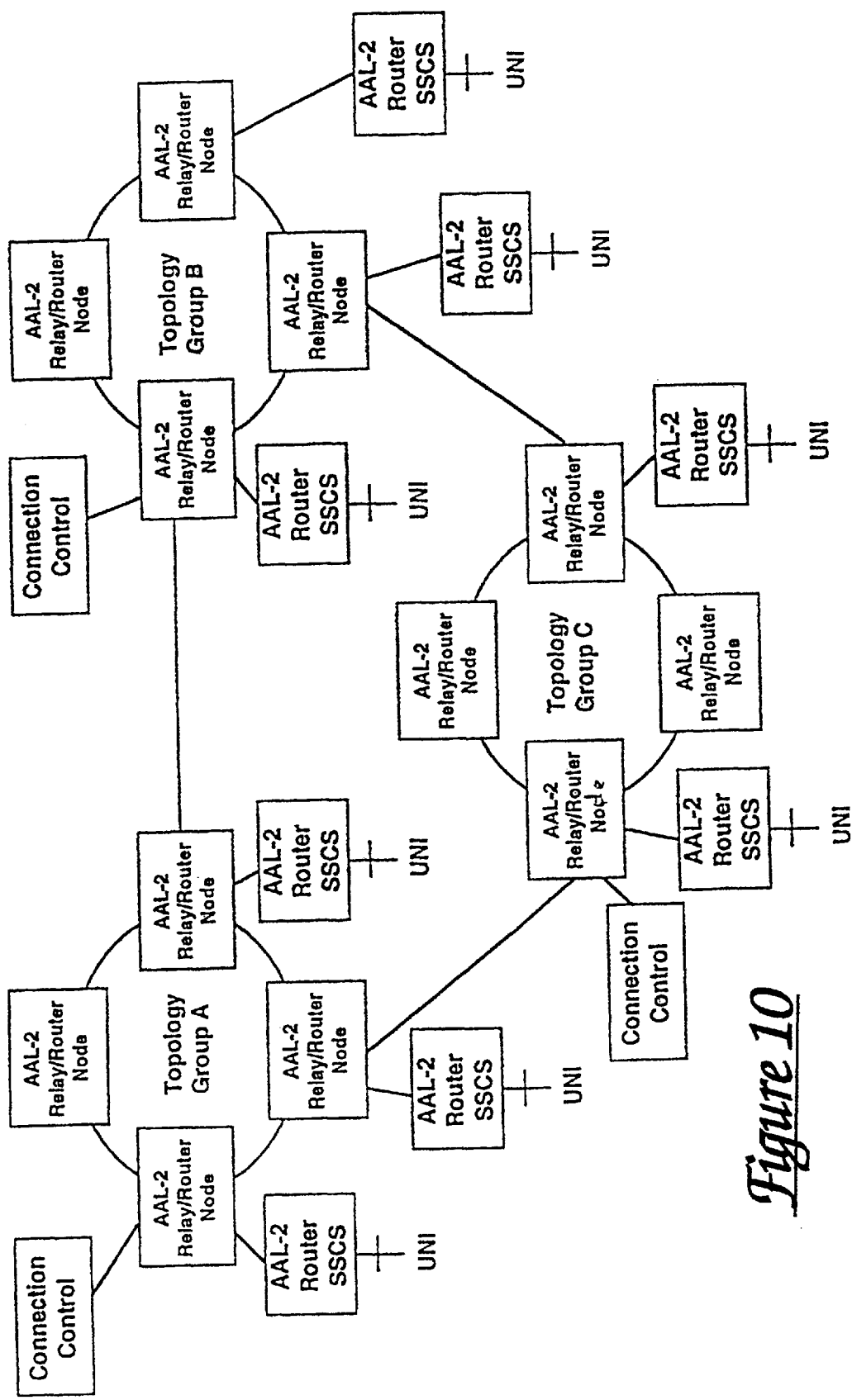
FIG. 10 illustrates a ground based application of the system.

The same system can be used in ground based applications in order to provide resilience to equipment failure events without the need to perform explicit protection switching functions. This is illustrated in FIG. 10. This network comprises a number of AAL-2 Relay/Router nodes as described above in relation to FIG. 7. The relay/router nodes are connected by a ring of transport entities in order to form a topology group, the topology groups are then interconnected by means of a number of further transport systems to provide full network connectivity. Users access the system by a user network interface (UNI) which attaches to the AAL-2 relay/router nodes via an AAL-2 router SSCS function. Connection control functions are provided on a topology group basis. No preferred physical layer is shown in FIG. 10. In fact the system is independent of physical layer as the physical layer data stream is divided up into minicells. This process can exploit an existing packet format at this layer or if non exists it can treat the stream as an unstructured data stream and divide it into minicells without any reference to its contents. As a result the user network interface (UNI) can support any plesiochronous, synchronous or ATM physical layers so long as all intercommunicating UNIs conform as a consistent subset of the available transport physical layers.

Within a topology group a full mesh of virtual connections is maintained between all members of the group, each pair of AAL-2 relay/router nodes is connected by a pair of virtual connections going opposite ways around the ring. Each pair of topology groups is connected by at least two paths. A path may be direct in which case it can be carried as a single virtual connection or via a third topology group, in which case it will require two virtual connections in order to go both ways around the ring of the third topology group. Within a topology group the nodes advertise the locations of users and also the locations of virtual connections to other topology groups, between topology groups the identities of the remote topology group is advertised.

This application does not include a mobility aspect so the routing of packets can be achieved with two steps, routing first to a topology group and then to the destination node. Routing of individual packets needs a set of rules. E.g. if a connection between two topology groups is by means of a single direct virtual connection plus two virtual connections connected indirectly via a third topology group, then 50% of the packets would be sent on the direct virtual connection and 25% via each of the two indirect virtual connections. If an indirect virtual connection fails then the other indirect virtual connection receives 50% of the packets. If the direct virtual connection fails then each indirect virtual connection receives 50% of the packets. If both indirect virtual connection's fail then the direct virtual connection receives 100% of the traffic. For a given set of routing rules and a given interconnect between the topology groups then it is possible to define a connection control algorithm which is robust against any single failure scenario and is in addition robust against many multiple failure scenarios.

It will be understood that the above description of a preferred embodiment is given by way of example only and that various modifications may be made by those skilled in the art without departing from the spirit and scope of the invention.

What is claimed is:

1. A method of determining routing of traffic in a connectionless network incorporating a plurality of nodes and having a changing topology, the method comprising providing a virtual model of the network, said model consisting of fixed virtual nodes, determining within the model routing for the traffic in the real network, reflecting said topology changes in the network by temporarily associating the virtual nodes of the model with corresponding real nodes so as to provide each said real node with a respective virtual node identity, communicating the virtual identity of each said real node to its neighbouring nodes, and performing traffic routing in the real network with reference to the current embodiment of the virtual network.

2. A method as claimed in claim 1, wherein the network has an available bandwidth which is maintained substantially constant.

3. A method as claimed in claim 1, wherein user traffic is allocated to time slots.

4. A method as claimed in claim 3, wherein, prior to transmission of a message between first and second users, a path request is sent to a connection control centre, and wherein said connection control centre verifies that a said virtual node for said first user and the virtual nodes adjacent that virtual node all have sufficient available time slot capacity.

5. A method as claimed in claim 4, wherein said traffic comprises connectionless packets.

6. A connectionless communications network incorporating a plurality of nodes and having a changing topology, the network including a virtual model consisting of fixed virtual nodes, there being means for determining within the virtual model routing for traffic in the real network, means for reflecting said topology changes in the network by temporarily associating the virtual nodes of the model with corresponding real nodes so as to provide each said real node with a respective virtual node identity, and means for communicating the virtual identity of each said real node to its neighbouring nodes so as to perform traffic routing in the real network.

7. An arrangement as claimed in claim 6, and having means for maintaining available bandwidth substantially constant as the network topology changes.

8. An arrangement as claimed in claim 6, wherein user traffic is allocated to time slots.

9. An arrangement as claimed in claim 8, wherein, prior to transmission of a message between first and second users, a path request is sent to a connection control centre, and wherein said connection control centre verifies that a said virtual node for said first user and the virtual nodes adjacent that virtual node all have sufficient available time slot capacity.

10. An arrangement as claimed in claim 6 and incorporating topology groups of virtual nodes, the virtual nodes within a said group being fully interconnected.

11. An arrangement as claimed in claim 6 and including a synchronous or plesiochronous digital hierarchy user network interface.

12. An arrangement as claimed in claim 6, and including an synchronous transfer mode (ATM) user network interface.

13. A method according to claim 1 wherein the nodes are a plurality of non-geo-stationary satellites.

14. A communications network according to claim 6 wherein the nodes are a plurality of non-geo-stationary satellites.

* * * * *